United States Patent
Shaffer (10) Patent No.: US 8,292,555 B2
(45) Date of Patent: Oct. 23, 2012

(54) DRILL BIT CONFIGURATION

(76) Inventor: William Allen Shaffer, Scottdale, PA (US)

(*) Notice: Subject to any disclaimer, the term of this patent is extended or adjusted under 35 U.S.C. 154(b) by 1028 days.

(21) Appl. No.: 12/221,088

(22) Filed: Jul. 31, 2008

(65) Prior Publication Data

US 2010/0028098 A1    Feb. 4, 2010

(51) Int. Cl.
B23B 51/02    (2006.01)
(52) U.S. Cl. ......................... 408/230; 408/227
(58) Field of Classification Search ............ 408/230, 408/229, 227, 59
See application file for complete search history.

(56) References Cited

U.S. PATENT DOCUMENTS

| | | | | |
|---|---|---|---|---|
| 2,396,335 A * | 3/1946 | Moller | ............ | 408/230 |
| 2,769,355 A * | 11/1956 | Crisp | ............ | 408/230 |
| 4,231,692 A * | 11/1980 | Brabetz et al. | ............ | 408/230 |
| 5,230,593 A * | 7/1993 | Imanaga et al. | ............ | 408/230 |
| 5,590,987 A * | 1/1997 | Bouzounie | ............ | 408/230 |
| 5,716,172 A * | 2/1998 | Nakamura et al. | ............ | 408/230 |
| 5,762,538 A * | 6/1998 | Shaffer | ............ | 451/36 |
| 5,931,615 A * | 8/1999 | Wiker | ............ | 408/230 |
| 6,309,149 B1 * | 10/2001 | Borschert et al. | ............ | 408/230 |
| 6,676,342 B2 | 1/2004 | Mast | | |
| 6,739,809 B2 * | 5/2004 | Shaffer | ............ | 408/230 |
| 6,923,602 B2 * | 8/2005 | Osawa et al. | ............ | 408/230 |
| 6,988,859 B2 * | 1/2006 | Borschert et al. | ............ | 408/230 |
| 2006/0039767 A1 * | 2/2006 | Yamamoto et al. | ............ | 408/230 |
| 2008/0298918 A1 * | 12/2008 | Brink | ............ | 408/230 |

FOREIGN PATENT DOCUMENTS

JP    62044304 A  *  2/1987
JP    2006205272 A  *  8/2006

* cited by examiner

*Primary Examiner* — Daniel Howell
*Assistant Examiner* — Paul M Janeski
(74) *Attorney, Agent, or Firm* — Lawrence R. Burns (57) ABSTRACT

This invention has to do with a rotary twist drill of the type having a fluted cylindrical shank with a drill bit end having at least two cutting edges extending radially outwardly from the longitudinal axis of the drill. Cutting edges are formed by the intersection of the flutes with the drill point end and extend radially outwardly from the center of the drill body to the outer perimeter of the drill body. Gashes formed on the drill point end form innermost cutting edge portions which are symmetrical with one another about a point offset both horizontally and vertically from the axial centerline of the drill body so as to allow a positive cutting action at the centerline of the material to be removed.

2 Claims, 7 Drawing Sheets

DRILL BIT CONFIGURATION

BACKGROUND OF THE INVENTION

Titanium and alloys of titanium are widely useful materials, in that they have a high hardness, a high strength to weight ratio at elevated temperatures, a relatively low thermal conductivity, exceptional resistance to corrosion, and they are stronger in compression than in tension. Such materials are used extensively in the aerospace industry and are now quite commonly used where the harsh environments of heat or corrosion would have a deleterious affect on structure used in such environments.

The same properties that make the titanium materials useful in industry also make it difficult to form and shape to a desired configuration. The hardness, strength in compression, and low thermal conductivity all make the metalworking of titanium and it's alloys unusually difficult. Such metalworking of titanium includes the removal of material by cutting action and more specifically includes the drilling of holes or apertures in the body of titanium material.

In normal machining of steels or other materials, a large part of the heat generated by the cutting or shearing of the material is contained in the chip and carried away from the work area as the chip flows past the drill point. Because titanium has a low heat conductivity much of the heat generated by the cutting or shearing action is not carried away by the departing titanium chips resulting in temperatures at the cutting surface ranging from 1000 degrees F. to 2000 degrees F. In addition the drill point cutting surfaces may be experiencing pressures of 200,000 to 300,00 PSI.

In the past the drills that have been available for drilling of titanium have used cutting edges that either present a negative cutting action to the material to be removed or a drill point configuration that extrudes the material before a positive cutting action can be presented to the work piece. The center material is to be removed from the work piece by drilling is referred to as the web and it is desirable that it be removed by a cutting action rather than an extruding action.

SUMMARY OF THE INVENTION

According to the present invention an elongate cylindrical drill body has a retaining shank on one end and an opposing drill point end for metalworking. Flutes are oppositely formed in the drill body and extend spirally along the drill body and intersect the drill point end of the drill body. When the flutes intersect the drill point end of the drill body each flute creates a cutting edge, a chip contact surface behind the cutting edge and a chip guide surface opposite the cutting edge. The cutting edges formed by the intersection of the flutes with the drill point end extend radially outwardly from the center to the outer perimeter of the drill body. Gashes are formed joining the drill point end with the chip guide surface and intersecting said radially extending cutting edges to from radially innermost cutting edge portions on each cutting edge. A curvature joins the radially innermost cutting edge with its radially outward extending portion which curvature is in the opposite direction of intended rotation of the drill bit. The opposing radially innermost cutting edges are symmetrical about a center point that is offset from the axial centerline of the drill bit body. A first cutting edge is located above the horizontal and vertical centerlines of the drill body and a second cutting edge is located below the horizontal and vertical centerline of the drill bit body thus allowing a positive cutting action at that the centerline of the material to be removed. The offset is preferably from 0.1 to 1 mm from either of the horizontal or vertical axis, and locates a first cutting edge as originating and extending above both the horizontal and vertical centerline of the drill bit body and a second cutting edge below the horizontal and vertical centerlines of the drill bit body. The cutting edges toward the perimeter of the drill bit body and curve in the opposite direction of the intended rotation of the drill. The cutting edges are formed to present a positive cutting rake angle to the material to be removed with the preferred positive rake cutting angles are in the range of from 5 to 7 degrees on the face and 2 degrees positive in the gash. Drills manufactured according to the present invention may comprise materials of cemented carbide, high speed steel and ceramics. Previously ceramic materials for rotary drill bits were limited but with this advance it is thought that ceramic materials may now be used for the ferrous alloy rotary drill bits.

OBJECTS OF THE INVENTION

It is an object of the present invention to provide an offset web drill bit for the metalworking industry that allows a positive rake cutting action at the centerline of the material to be removed.

It is an object of the present invention to provide a tool for superior drilling action when working on any material but especially with titanium and titanium based alloy materials.

It is an object of the present invention to provide a drill bit configuration that presents positive rake cutting edges when used for metalworking and especially the drilling of titanium and titanium based alloy materials.

It is an object of the present invention to provide a drill bit configuration having two cutting edges symmetrical to one another about a point that is located off the longitudinal centerline of the drill bit body such that one cutting edge is located above the horizontal and vertical centerline of the drill body, while the second cutting edge is located below the horizontal and vertical centerline of the drill bit body.

It is an object of the present invention to provide a drill bit that has two cutting edges with one cutting edge located above the horizontal and the vertical of the longitudinal centerline of the drill bit body and the other located below the horizontal and the vertical of the centerline of the drill bit body.

It is an object of the present invention to provide a more efficient drill bit configuration for the metalworking of titanium and titanium based alloy materials.

It is a further object of the present invention to provide a drill bit that is capable of removing material faster from titanium and titanium based alloy materials.

It is a further object of the present invention to provide a drill bit having a longer lasting useful life in the metalworking of titanium and titanium based alloy materials.

It is a further object of the present invention to provide a drill bit that reduces the generation of heat during the shearing action of the metal from the work piece.

DETAILED DESCRIPTION OF THE DRAWINGS

Figures 1, 2:
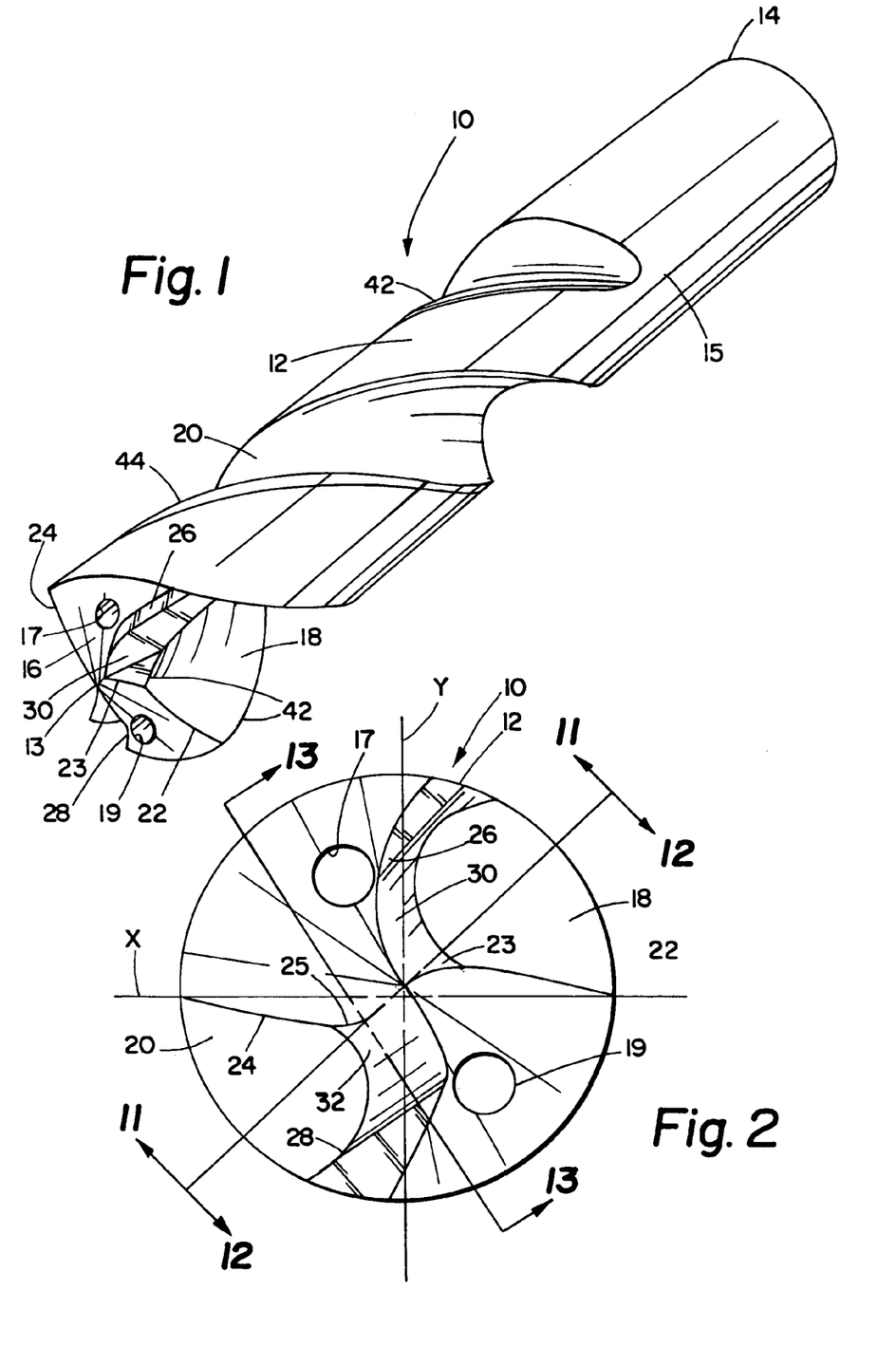
FIG. 1 is a perspective view of the drill bit according to the present invention.
FIG. 2 is an end view of the drill bit tip according to the present invention.

What is shown in FIG. 1 is a perspective view of the drill bit 10 according to the present invention. The drill bit 10 has a drill bit body 12 with a retainer shank 14 on one end and a drill point end 16 on the other end. The drill bit body 12 will taper diametrically inward from the drill point end 16 to the foremost portion 15 of the retainer shank 14. The preferable taper is 0.25 millimeters in diameter per 100 millimeters in length. The drill point end 16 has an apex 13 formed thereon along with two radially extending cutting edges 22 and 24. Extending along the axial length of the drill bit body 12 are flutes 18 and 20 that extend from the foremost portion 15 of the retainer shank 14 forward and through the drill point end 16. Radially extending cutting edges 22 and 24 are formed as the flutes 18 and 20 intersect the drill point end 16. The intersection of the flutes 18 and 20 with the drill point end 16 forms not only the cutting edges 22 and 24 but also opposing chip guide surfaces 26 and 28. The chip guide surfaces 26 and 28 help guide the chip material from the cutting edges 22 and 24 outwardly along the radially extending flutes 18 and 20. Bordering the chip guide surfaces 26 and 28 are cylindrical lands 42 and 44. Chip gash surfaces 26 and 28 are formed between the drill point end 16 and the chip guide surfaces 30 and 32 respectfully, so that each chip gash forms the innermost cutting edge portions 23 and 25 on cutting edge 22 and 24 respectfully. The innermost cutting edge 23 associated with cutting edge 22 is curved. The cutting edge 24 has an innermost cutting 25 (not shown in FIG. 1), which is curved. The curvature of cutting edge portions 23 is preferably determined to be approximately 0.13 of the diameter of the drill bit body.) The chip gashes 30 and 32 are formed between the chip guide surfaces 26 and 28 and form the innermost cutting edges 23 and 25.

What is shown in FIG. 2 is an end view of the drill bit 10 according to the present invention. The drill bit 10 is shown having the radially extending cutting edges 22 and 24 with coolant holes 17 and 19 coming through the end 16. The drill point end 16 shows the gashes 30 and 32 such that the part of the gash at 30 forms the innermost cutting edge 23 associated with the radially extending cutting edge 22. Part of the gash at 32 forms the innermost cutting edge 25 associated with the radially extended cutting edge 24. The radius of the innermost cutting edge portion is preferably to be approximately 0.13 of the diameter of the drill bit. The cutting edges 23 and 25 formed in FIG. 2 are symmetrical about a longitudinal axis offset from the centerline of the drill body 12 with the innermost cutting edge 23 being located above the horizontal and on the vertical axis as shown on x-x axis and the y-y axis in FIG. 2. The innermost cutting edge 25 is shown located above the horizontal x-x axis and on the vertical y-y axis in FIG. 7. The flutes 18 and 20 are shown intersecting the drill point end 16.

Figure 3:
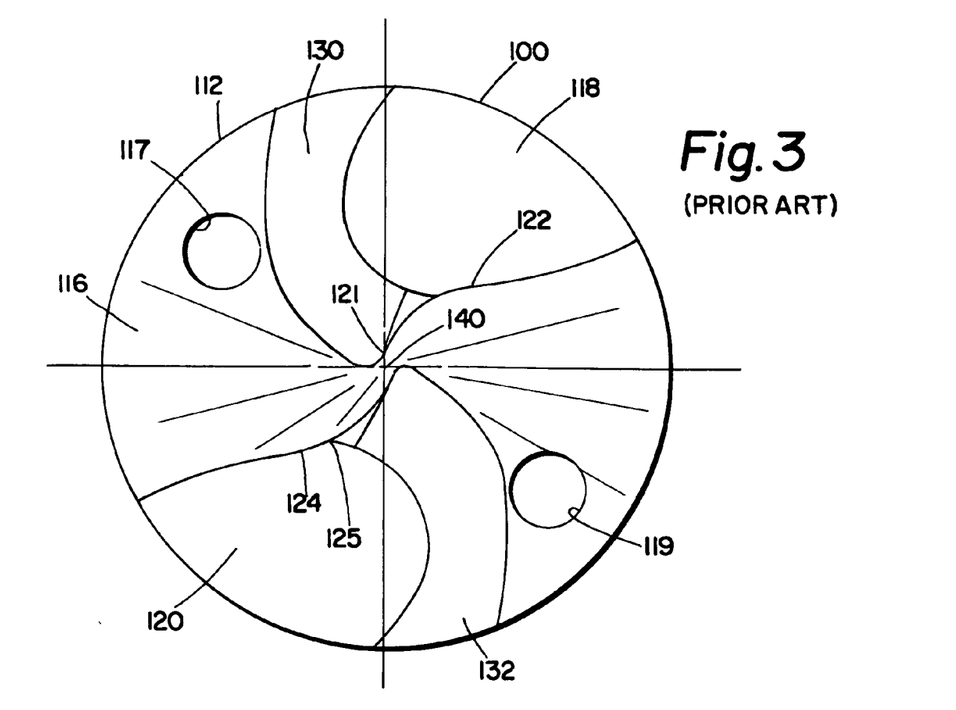
FIG. 3 is an enlarged fragmented perspective of the drill bit according to the present invention.

What is shown in FIG. 3 is the prior art type of drill bit 100. Shown therein is the drill bit body 112 having the flutes 118 and 120. The flutes 118 and 120 intersect at the drill point end 116 and form cutting edges 122 and 124. The chip gashes 130 and 132 help form the radially innermost part 121 of the cutting edge 122 and the radially innermost portion 125 of cutting edge 124. As can be seen in FIG. 3, the prior art cutting edges do not provide a cutting action on the centerline of the drill thereby requiring that when the drill contacts the work piece there be some extrusion of the material before a cutting action can begin. The cutting edges of the prior art drill are symmetrical about the axial centerline of the drill and form a web 140 on center as can be seen when referring to FIG. 3.

Figure 4:
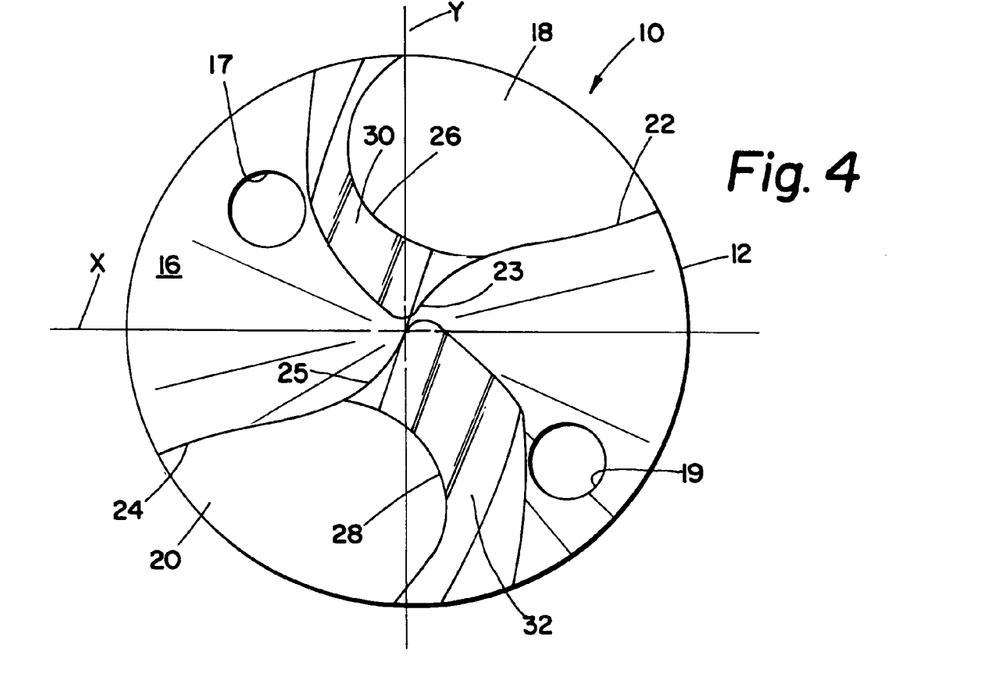
FIG. 4 is an enlarged fragmentary perspective of the drill bit according to the present invention rotated 180 degrees from position in FIG. 3.

What is shown in FIG. 4 is again the drill bit 10 according to the present invention. FIG. 4 shows more clearly the drill point end 16 showing the flutes 18 and 20 as they intersect the drill point end 16. Also shown are the chip guide surfaces 26 and 28 as they relate to the flutes 18 and 20. The cutting edge 22 has a radially innermost curved portion 23. Also shown in FIG. 4 is the cutting edge 24 having its radially innermost curved cutting edge portion 25. As can be seen in FIG. 4 the chip gash 30 is formed joining the drill point end 16 and the chip guide surface 26, and a part of the gash 30 forms the radially innermost curved cutting portion 23 of cutting edge 22. On the opposing side the chip gash 32 has a part that forms the radially innermost curved cutting edge 25 of cutting edge 24. Shown more clearly in FIG. 4 is the fact that the radially innermost cutting 23 is located above the horizontal x-x axis and is on the y-y vertical axis of the drill bit body 12 so as to provide a positive cutting rake to the centermost portion of the material to be worked on. Shown also in FIG. 2 is the radially innermost cutting edge portion 25 of cutting edge 24 shown as it is originates above the horizontal axis x-y of the drill bit body 12 and on the centerline y-y thereby providing a positive cutting rake action to take out the center of the work piece material. Shown also in FIG. 4 are the coolant holes 17 and 19 that carry coolant fluid to and from the work piece.

Figure 5:
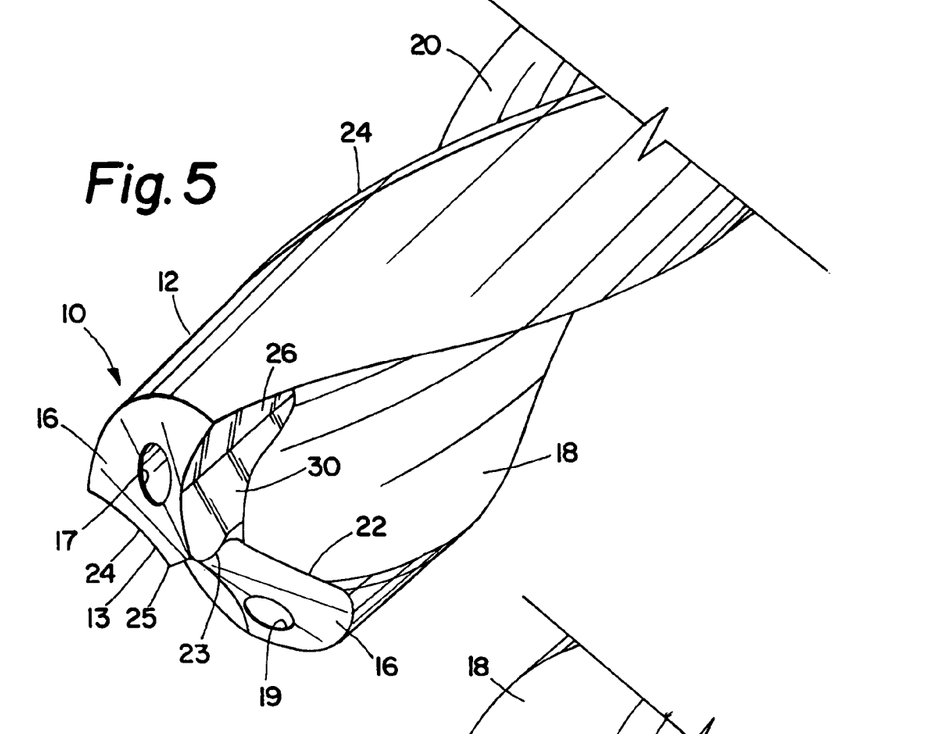
FIG. 5 is a side fragmentary view of the drill bit according to the present invention.

What is shown in FIG. 5 is a side fragmentary view of the drill bit 10 according to the present invention. FIG. 5 shows the drill bit body 12 with the drill point end 16 having the apex 13 shown thereon. The flute 18 is shown intersecting the drill point end 16 and chip gash 30 is shown formed joining the flute 18 and the innermost curved cutting edge portion 23 of the radially extending cutting edge 22. The cutting edge 22 with its radially innermost cutting portion 23 originates at a point off set from the center of the drill that is located above the horizontal and vertical center of the drill.

Figure 6:
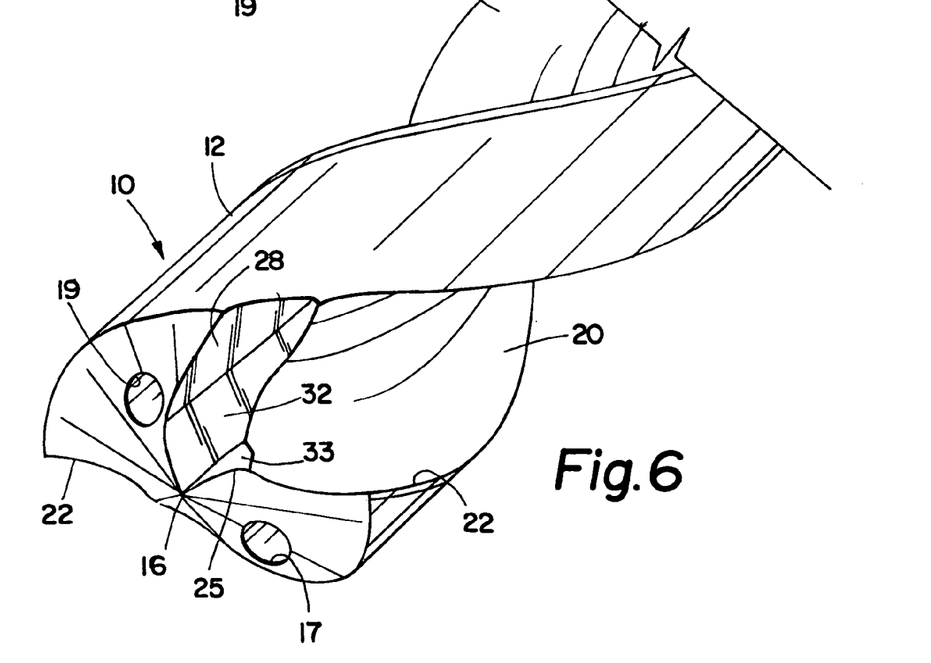
FIG. 6 is a side fragmentary view of the drill bit according to the present invention rotated 90 degrees from position of FIG. 5.

What is shown in FIG. 6 is a side fragmentary view of the drill bit 10 according to the present invention but rotated 180 degrees from the position shown in FIG. 5. Shown more clearly therein is the flute 20 intersecting the drill point end 16 that is formed on the drill bit body. (coolant holes 17 and 19 are shown intersecting the drill point end 16 and the radially extending cutting edge 24 is shown having an innermost curve cutting portion 25). Cutting edges 22 and 24 are shown thereon with 24 having its radially innermost end 25 shown thereon. The gash 32 is shown with a part of it forming the radially innermost cutting 25 of cutting edge 24. Shown in FIG. 6 is the chip guide 28 as it intersects the end 16 and the chip gash 32 as it also intersects the drilling end point 16. The part of the gash 32 that forms the cutting edge 25 is shown at 33, and 23 is the cutting edge relief surface that gives the positive rake angel of above 3 degrees to the cutting edge as it interacts with the work piece. The relief surface 33 has a positive rake surface with cutting edge 25 of approximately 3 degrees.

Figure 7:
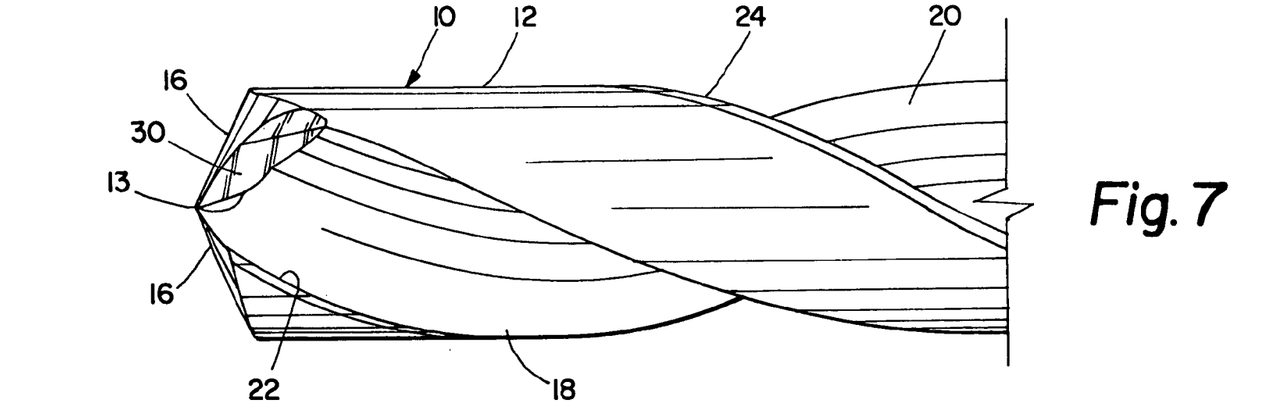
FIG. 7 is a side fragmentary view of the drill bit according to the present invention rotated 90 degrees from position of FIG. 6.

What is shown in FIG. 7 is a side fragmentary view of the drill bit 10 according to the present invention. Drill bit 10 has the drill bit body 12 with a forward drill point end 16 having an apex 13 formed thereon. Flutes 18 and 20 extend longitudinally along the drill bit body 12 and intersection with the drill point face 16. The cylindrical land 42 is shown associated with the flute 18 and forms the bound as flute 18 extends longitudinally along the drill. At the juncture of flute 18, with the drill point end 16, the cutting edge 22 is formed as shown in FIG. 7.

Figure 8:
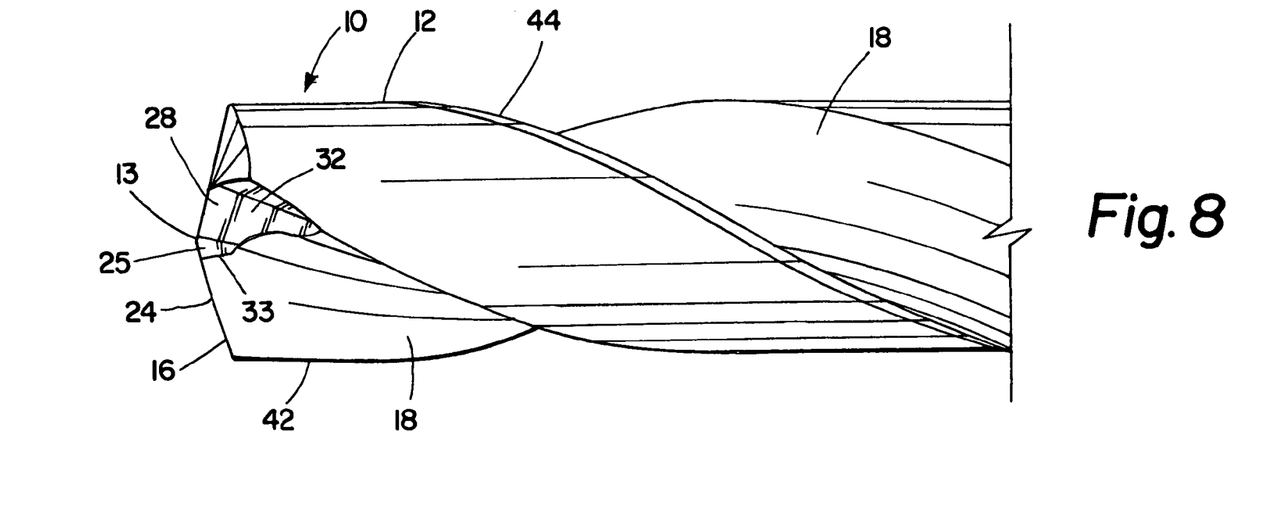
FIG. 8 is a side fragmentary view of the drill bit according to the present invention rotated 90 degrees from position of FIG. 7.

What is shown in FIG. 8 is a side fragmentary view of the drill bit 10 according to the present invention but rotated 90 degrees counter clockwise from the position shown in FIG. 7. Shown in FIG. 8 is the drill bit 10 having the drill bit body 12 with the drill point end 16 having an apex shown at 13. Flute 20 is shown with its cylindrical land 44 and flute 18 is shown with its cylindrical land 42. Flute 18 intersects the drill point end 16 and forms the radially extending cutting edge shown at 24. The radially extending cutting 24 has an innermost edge portion 25 formed by chip gash shown at 32. The chip relief surface 33 is shown associated with the chip cutting edge 24. The flutes 18 and 20 are shown intersecting the drill point end 16.

Figure 9:
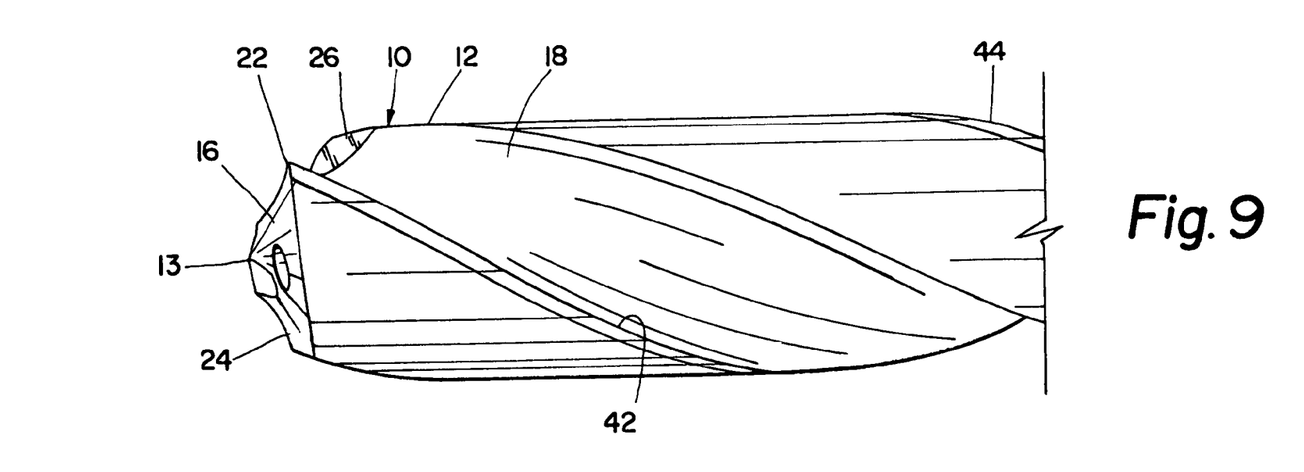
FIG. 9 is an enlarged cross section taken on Line 9-9 of FIG. 2 of the drill bit according to the present invention.

What is shown in FIG. 9 is a side fragmentary view of the drill bit 10 according to the present invention but rotated 90 degrees counter clockwise from the view shown in FIG. 8. The drill bit 10 has a drill bit body 12 with a forward drill point end 16 with an apex 13 formed on the drill bit point 16. Flute 18 is shown with its associated cylindrically land 42 and shown also is the cylindrically land 44 associated with flute 20 (not shown). Seen in FIG. 9 is the chip guide surface 26 and the radially extending cutting edge 22. The radially extending cutting edges 22 and 24 are shown in the view at the drill point end 16. Coolant holes 6 are shown formed through the end of the drill point surface 16 and such coolant holes extend longitudinally through the entire drill bit body 12 from the shank end 14 (not shown) through the drill point end 16.

Figure 10:
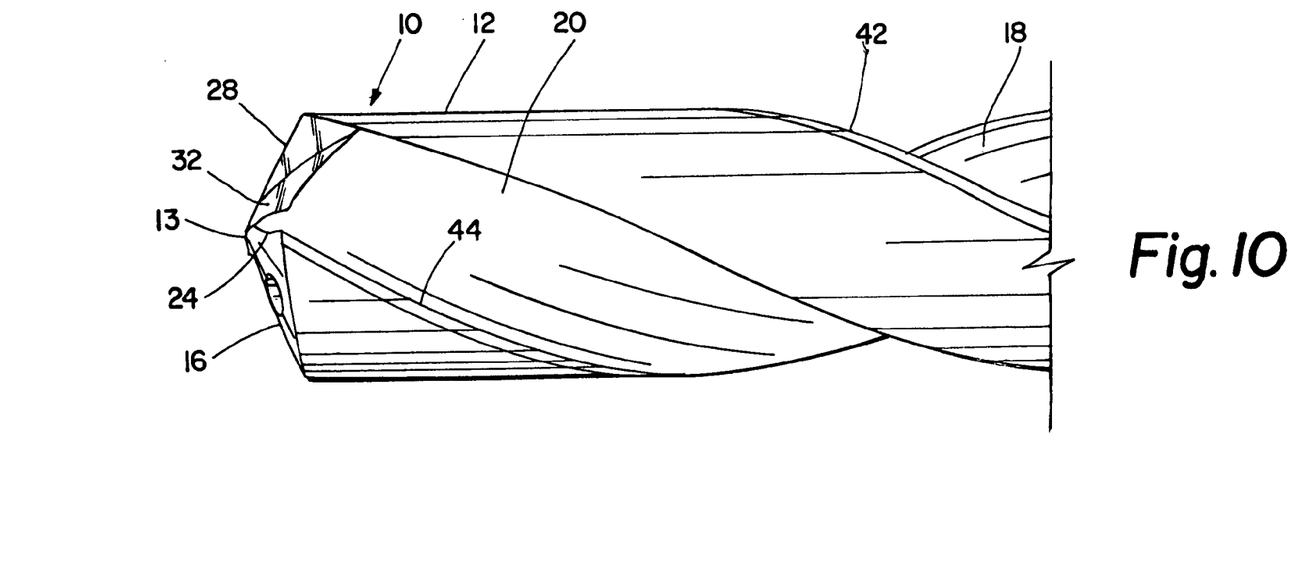
FIG. 10 is an enlarged cross-section of the drill bit according to the present invention taken on line 10-10 of FIG. 2.

What is shown in FIG. 10 is a side fragmentary view of the drill bit 10 according to the present invention but rotated 90 degrees counter clockwise from the view shown in FIG. 9. The drill bit 10 has a drill bit body 12 having a drill point end 16 with an apex 13 formed on the drill point end 16. Flute 18 and 20 are shown extending through and intersecting with the drill point end 16 with the flute 18 having an associated cylindrical land 42 and the flute 20 having its associated cylindrical land 44. Shown in FIG. 10 is the radially extending cutting edge 24 with the chip gash 32 shown formed on the drill point end 16.

Figure 11:
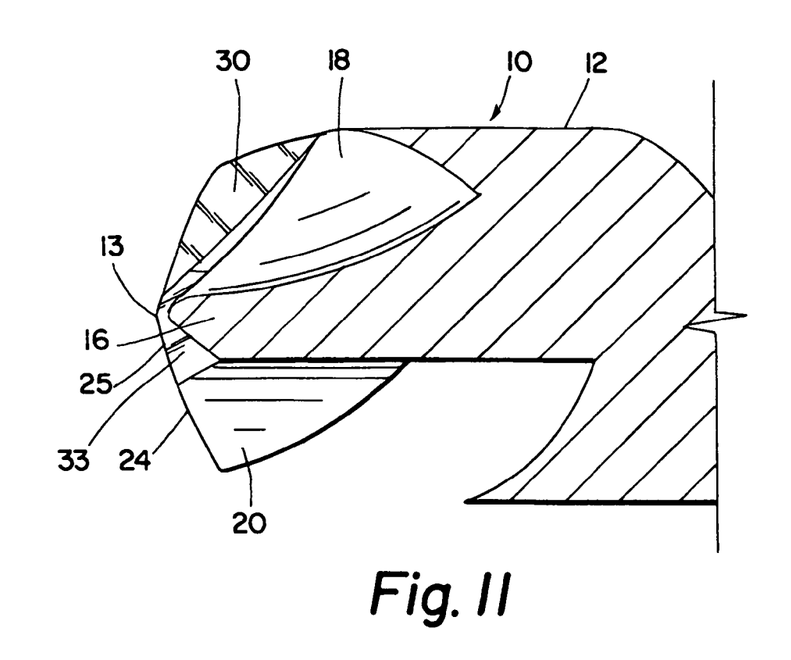
FIG. 11 is an enlarged cross-section of the drill bit 10 according to the present invention, with the cross section being taken on line 11-11 of FIG. 2.

What is shown in FIG. 11 is an enlarged cross-section of the drill bit 10 through lines 11-11 of FIG. 2. The drill bit 10 has a drill bit body 12 shown with the forward drill point end 16 having the apex shown at 13. Chip gash 30 is shown. Flute 20 is shown intersecting the drill point end 16 so as to form the radially extending cutting edge 24, which has an innermost curved cutting edge 25. The innermost cutting edge 25 has the relief surface 33 shown thereon as such that when the cutting edge 25 is presented to the work piece there is preferably an approximate three degree positive rake angel that cuts the material from the centerline of the work piece.

Figure 12:
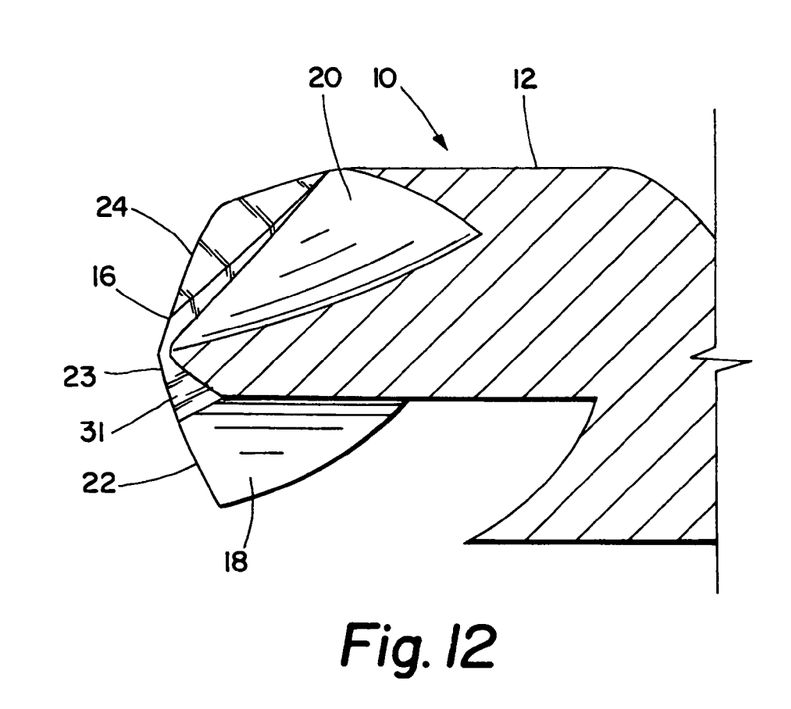
FIG. 12 is an enlarged cross-section of the drill bit 10 according to the present invention, with the cross section being taken on line 12-12 of FIG. 2.

What is shown in FIG. 12 is an enlarged cross-section of the drill bit 10 according to the present invention, with the cross section being taken on line 12-12 of FIG. 2. Shown therein again is the drill bit 10 according to the present invention having the drill bit body 12. Flute 18 is shown intersecting the drill point end 16 and forming the radially extending cutting edge 22. The radially extending cutting edge 22 has an innermost curved cutting portion 23. A relief surface 31 is formed behind the radially innermost curved cutting portion 23 of the cutting edge 22 as such that a positive raked cutting angel of about three degrees is presented to the work piece when the initial cut of the material is made.

Figure 13:
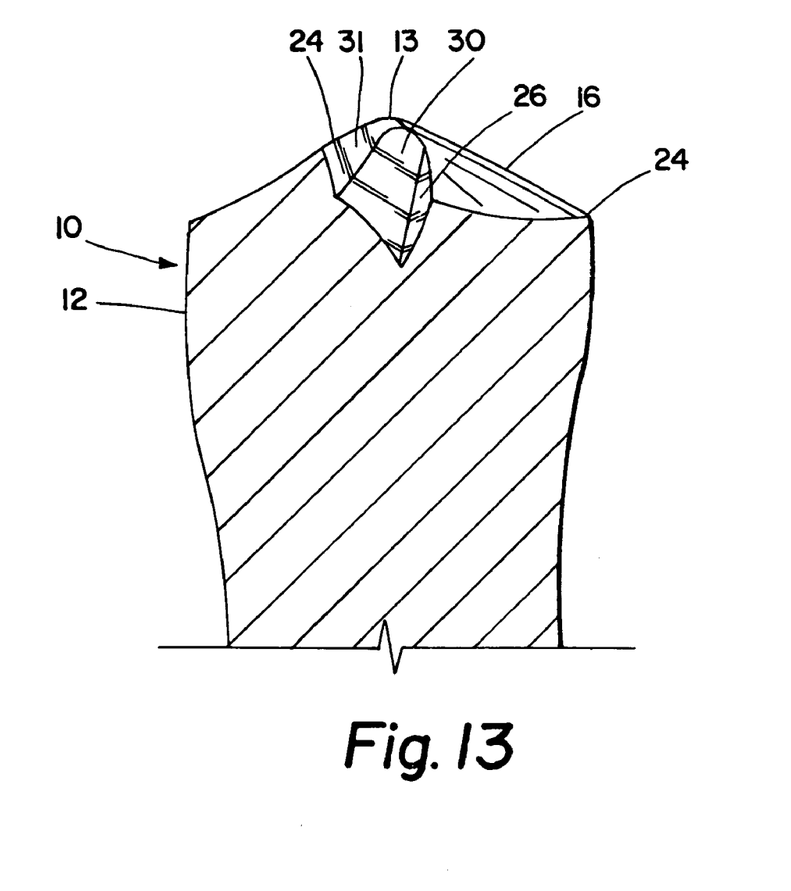
FIG. 13 is a sectional view of the drill bit 10 according the present invention through line 13-13 in FIG. 2.

What is shown in FIG. 13 is a FIG. 13 is a sectional view of the drill bit 10 according the present invention through line 13-13 in FIG. 2. Shown therein is the drill bit 10 according to the present invention having the drill bit body 12 and the drill point end 16 with an apex 13 shown thereon. The radially innermost curved cutting edge 23 is shown along with the chip gash 30 and relief surface 31 is shown associated with the cutting edge 23. The chip guide surface 26 is shown as it intersects the drill point end 16 and the radially extending cutting edge 24 is shown as it also intersects with the drill point end 16.

I claim:

1. An elongate cylindrical drill body having a retainer shank on one end and a drill point on the other end and comprising:
    a. At least two longitudinally extending flutes oppositely formed in the drill body and extending spirally along said drill body away from the retaining shank and through said drill point end;
    b. Each flute when intersecting said drill point end forming a radially outward extending cutting edge with an adjacent chip guide surface;
    c. Said radially extending cutting edges having a curved radially innermost cutting edge formed by a chip gash joining each flute with said cutting point end;
    d. Said radially innermost part of said cutting edges and said gash configured to present a positive cutting rake angle to the material to be removed; and
    e. The radially innermost cutting edges formed by the intersection of the gashes being symmetrical with one another about a point offset from the centerline of the drill body so as to allow a positive cutting rake action at the contact point of the material to be removed.

2. The drill body according to claim 1 in which the radius of curvature joining the innermost part of the cutting edge to the radially outermost extending part of the cutting edge is preferably configured to be from 10% to 16% of the diameter of the drill body.

* * * * *